United States Patent
Merfels et al.

(10) Patent No.: US 11,281,228 B2
(45) Date of Patent: Mar. 22, 2022

(54) METHOD AND DEVICE FOR DETERMINING A POSITION OF A TRANSPORTATION VEHICLE

(71) Applicant: VOLKSWAGEN AKTIENGESELLSCHAFT, Wolfsburg (DE)

(72) Inventors: Christian Merfels, Braunschweig (DE); Moritz Schack, Braunschweig (DE)

(73) Assignee: Volkswagen Aktiengesellschaft

( * ) Notice: Subject to any disclaimer, the term of this patent is extended or adjusted under 35 U.S.C. 154(b) by 387 days.

(21) Appl. No.: 16/436,996

(22) Filed: Jun. 11, 2019

(65) Prior Publication Data

US 2019/0384310 A1   Dec. 19, 2019

(30) Foreign Application Priority Data

Jun. 14, 2018   (DE) ...................... 10 2018 209 607.4

(51) Int. Cl.
*G05D 1/02* (2020.01)
*B60W 40/02* (2006.01)
(Continued)

(52) U.S. Cl.
CPC ........... *G05D 1/0238* (2013.01); *B60W 40/02* (2013.01); *G01C 21/28* (2013.01); *G05D 1/0257* (2013.01);
(Continued)

(58) Field of Classification Search
CPC .. G05D 1/0238; G05D 1/0257; G05D 1/0274; G05D 2201/02; B60W 40/02; G06K 9/00664; G01C 21/28
See application file for complete search history.

(56) References Cited

U.S. PATENT DOCUMENTS 7,689,321 B2 * 3/2010 Karlsson ............. G06K 9/6296
700/253
7,899,616 B2 * 3/2011 Breed ................... G08G 1/161
701/423
(Continued)

FOREIGN PATENT DOCUMENTS

DE   102014223363 A1   5/2016
DE   102016214028 A1   2/2018
(Continued)

OTHER PUBLICATIONS

Lu et al.; Visual Navigation Using Heterogeneous Landmarks and Unsupervised Geometric Constraints; IEEE Transactions on Robotics; Jun. 2015; pp. 736-749; vol. 31, No. 3.
(Continued)

*Primary Examiner* — Angelina Shudy
(74) *Attorney, Agent, or Firm* — Barnes & Thornburg LLP

(57) ABSTRACT

A method and a device for determining a position of a transportation vehicle. A preliminary position of the transportation vehicle is determined, objects are detected in an area surrounding the transportation vehicle wherein the objects have at least visible and virtual building corners, the detected objects are transferred into a local coordinate system and are assigned to a map with objects based on the preliminary position of the transportation vehicle, and the position of the transportation vehicle is determined based on an equalization calculus in which the objects in the map which are most suitable for the objects transferred into the local coordinate system are ascertained.

18 Claims, 6 Drawing Sheets

(51) Int. Cl.
*G01C 21/28* (2006.01)
*G06K 9/00* (2022.01)

(52) U.S. Cl.
CPC ....... *G05D 1/0274* (2013.01); *G06K 9/00664* (2013.01); *G05D 2201/02* (2013.01)

(56) References Cited

U.S. PATENT DOCUMENTS

| | | | | |
|---|---|---|---|---|
| 7,983,802 | B2* | 7/2011 | Breed | G08G 1/161 |
| | | | | 701/1 |
| 8,577,538 | B2* | 11/2013 | Lenser | G05D 1/0038 |
| | | | | 701/28 |
| 8,892,392 | B2* | 11/2014 | Perala | G01S 19/072 |
| | | | | 702/150 |
| 9,201,424 | B1* | 12/2015 | Ogale | G05D 1/0253 |
| 9,574,883 | B2* | 2/2017 | Watts | H04W 4/33 |
| 10,346,687 | B2* | 7/2019 | Pestun | G06K 9/00651 |
| 10,384,679 | B2* | 8/2019 | Fujita | G01C 21/30 |
| 10,569,770 | B1* | 2/2020 | You | B60W 30/09 |
| 10,650,285 | B1* | 5/2020 | Okazaki | G06T 7/00 |
| 10,696,227 | B2* | 6/2020 | Stein | B60W 10/22 |
| 10,955,854 | B2* | 3/2021 | Fechner | G05D 1/0278 |
| 11,024,055 | B2* | 6/2021 | Hsu | G01S 17/42 |
| 11,079,492 | B1* | 8/2021 | Stumm | G05D 1/0231 |
| 2006/0106533 | A1* | 5/2006 | Hirokawa | G05D 1/024 |
| | | | | 701/472 |
| 2008/0027591 | A1 | 1/2008 | Lenser et al. | |
| 2010/0106356 | A1* | 4/2010 | Trepagnier | G08G 1/16 |
| | | | | 701/25 |
| 2015/0134384 | A1* | 5/2015 | Heinonen | G06Q 10/0631 |
| | | | | 705/7.12 |
| 2015/0241230 | A1* | 8/2015 | Davidson | G06K 9/00812 |
| | | | | 701/533 |
| 2015/0285647 | A1* | 10/2015 | Meyer zu Helligen | A01B 79/005 |
| | | | | 701/533 |
| 2016/0046374 | A1* | 2/2016 | Kugelmass | H04Q 9/00 |
| | | | | 701/8 |
| 2016/0139255 | A1* | 5/2016 | Bueschenfeld | G01S 13/931 |
| | | | | 342/146 |
| 2017/0010618 | A1* | 1/2017 | Shashua | G01C 21/32 |
| 2017/0176998 | A1* | 6/2017 | Fechner | G05D 1/0278 |
| 2017/0371329 | A1 | 12/2017 | Giering et al. | |
| 2018/0189601 | A1* | 7/2018 | Dabeer | G06T 17/05 |
| 2018/0218214 | A1* | 8/2018 | Pestun | G06K 9/0063 |
| 2019/0370997 | A1* | 12/2019 | Hou | G06T 7/74 |
| 2020/0005058 | A1* | 1/2020 | Mielenz | G01S 11/12 |
| 2020/0126251 | A1* | 4/2020 | Viswanathan | G06K 9/03 |
| 2020/0175720 | A1* | 6/2020 | Hsu | G06T 7/75 |
| 2021/0350611 | A1* | 11/2021 | Ishihara | G06T 7/97 |
| 2021/0364320 | A1* | 11/2021 | Mennen | G06T 7/50 |

FOREIGN PATENT DOCUMENTS

| | | |
|---|---|---|
| DE | 102016214030 A1 | 2/2018 |
| WO | 2016153649 A1 | 9/2016 |

OTHER PUBLICATIONS

Ulas et al.; A Robust Feature Extraction Method and Semantic Data Association for 6D SLAM; World Automation Congress 2012; 2012; pp. 1-6; Puerto Vallarta, Mexico.

* cited by examiner

METHOD AND DEVICE FOR DETERMINING A POSITION OF A TRANSPORTATION VEHICLE

PRIORITY CLAIM

This patent application claims priority to German Patent Application No. 10 2018 209 607.4, filed 14 Jun. 2018, the disclosure of which is incorporated herein by reference in its entirety.

SUMMARY

Illustrative embodiments relate to a method and to a device for determining a position of a transportation vehicle.

BRIEF DESCRIPTION OF THE DRAWINGS

Disclosed embodiments are described in the following description and the appended claims in conjunction with the figures, in which:

DETAILED DESCRIPTION

Figure 1:
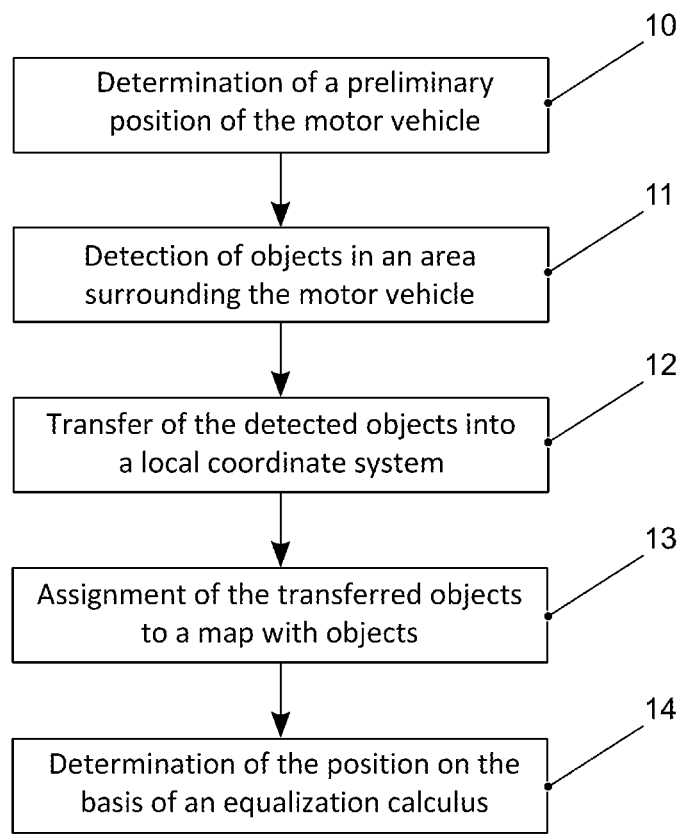
FIG. 1 shows a schematic view of a method for determining a position of a transportation vehicle.

Modern transportation vehicles are becoming increasingly autonomous, i.e., the transportation vehicles provide the driver with more and more functions and systems which assist him in controlling the transportation vehicle by instructions or taking over parts of the control of the transportation vehicle. A large amount of information about the transportation vehicle and its surroundings is required for such functions and systems.

For automatic driving functions, knowledge is required as to where the transportation vehicle is located relative to the lane or the center of the lane, the so-called center line. In addition to the information relating to lateral offset with respect to the corresponding lane, the longitudinal location is also required, for example, to be able to carry out driving maneuvers relative to objects at an intersection.

A first approach for the determination of a position is to use a digital lane geometry map which has been measured with high precision and which has absolute accuracy in the centimeter range in conjunction with a high-precision GPS system. In this context, the position in the map is determined using the GPS sensor without a further imaging sensor system. However, a solution with a high-precision map and high-precision GPS is very costly.

A further approach is to utilize data the sensor, such as, e.g., the use of feature clouds from radar, a camera or lidar. Here, a complex map of the feature cloud is generated and this is compared with a plurality of complex, currently acquired features. However, this approach is very intensive in terms of computing time and storage. The transmission of the map from the transportation vehicle into a backend, for example, for the purpose of updating the map, is very costly owing to the mobile radio costs.

Further approaches are in the field of thinned-out landmarks. Here, a landmark map with lane markings, curbs and road sides is generated and used for comparison with currently acquired features. However, landmarks can become out of date, e.g., as a result of wear of lane markings and can falsify the location-determination result. Therefore, the maps are re-generated several times a year to update the landmarks which are not very stable.

Against this background, DE 10 2016 214 028 A1 describes a method for determining a position of a transportation vehicle. In the method, an estimated position of the transportation vehicle is acquired, and reference map data are called up on the basis of the acquired estimated position. The reference map data comprise reference positions of landmarks. Data sets are acquired by an acquisition unit, and landmark observations with landmark parameters are determined on the basis of the data sets. Surroundings model data are determined on the basis of the determined landmark observations, wherein the surroundings model data comprise a description of traffic surroundings of the transportation vehicle. A multiplicity of position hypotheses are generated on the basis of the surroundings model data and the reference map data, and probabilities are assigned to the position hypotheses, wherein the position of the transportation vehicle is determined and output on the basis of the probabilities.

DE 10 2016 214 030 describes a method for determining a position of a transportation vehicle. In the method, data sets with data points are acquired by an acquisition unit, wherein each data set is assigned a point in time. Landmark observations are respectively determined for the acquired data sets, wherein the landmark observations are assigned landmark parameters and object classes. Surroundings model data are generated on the basis of the determined landmark observations, wherein the surroundings model data comprise a description of the traffic surroundings, and on the basis of the surroundings model data distance calculations are carried out for landmark observations on the basis of their object class and their landmark parameters, wherein distance values for the landmark observations are determined. In this context, on the basis of the distance values the landmark observations are assigned to determined landmarks. The surroundings model data are assigned probabilities, and the assigned probabilities are changed on the basis of the landmark observations. The surroundings model data are updated on the basis of the probabilities assigned to the landmark observations, and the surroundings model data are output.

WO 2016/153649 describes a method for generating maps with semantic designations. A computing unit determines a first map which contains features which are arranged at first positions, and semantic markings which are arranged at semantic positions. The computing unit additionally determines a second map which contains some of the features which are arranged at second positions. The computing unit can identify a first region with fixed features which are arranged at first positions and corresponding equivalent second positions. The computing unit can additionally identify a second region with shifted features, which are located at first positions and corresponding non-equivalent second positions. The computing unit can determine one or more transformations between first positions and second positions. The computing unit can assign the semantic markings to the second map at second semantic positions, wherein the second semantic positions in the first region are the same, and the second semantic positions in the second region are based on the transformations.

Disclosed embodiment provide improved solutions for determining a position of a transportation vehicle.

This is achieved by the disclosed method and by the disclosed device.

According to a first disclosed embodiment, a method for determining a position of a transportation vehicle comprises: determining a preliminary position of the transportation vehicle; detecting objects in an area surrounding the transportation vehicle, wherein the objects comprise visible and virtual building corners; transferring the detected objects into a local coordinate system; assigning the objects transferred into the local coordinate system to a map with objects on the basis of the preliminary position of the transportation vehicle; and determining the position of the transportation vehicle on the basis of an equalization calculus, in which the objects in the map which are most suitable for the objects transferred into the local coordinate system are ascertained.

According to a further disclosed embodiment, a computer-readable storage medium contains instructions which, when executed by a computer, cause the computer to execute the following for determining a position of a transportation vehicle: determining a preliminary position of the transportation vehicle; detecting objects in an area surrounding the transportation vehicle, wherein the objects comprise visible and virtual building corners; transferring the detected objects into a local coordinate system; assigning the objects transferred into the local coordinate system to a map with objects on the basis of the preliminary position of the transportation vehicle; and determining the position of the transportation vehicle on the basis of an equalization calculus, in which the object of the map which are most suitable for the objects transferred into the local coordinate system are ascertained.

The term computer is to be understood broadly. It also comprises control devices and other processor-based data processing devices.

According to a further disclosed embodiment, a device for determining a position of a transportation vehicle has a position-determining unit for determining a preliminary position of the transportation vehicle and a computing unit which is configured: to detect objects in an area surrounding the transportation vehicle, wherein the objects comprise at least visible and virtual building corners; to transfer the detected objects into a local coordinate system; to assign the objects transferred into the local coordinate system on the basis of the preliminary position of the transportation vehicle with respect to a map with objects; and to determine the position of the transportation vehicle on the basis of an equalization calculus, in which the objects in the map which are most suitable for the objects transferred into the local coordinate system are ascertained.

In the disclosed solution, an a-priori map with entered visible and virtual building corners and, if appropriate, further infrastructure objects is provided. The a-priori map can be present in the transportation vehicle or can be made available by a backend. Alternatively, the a-priori map can also be made available via vehicle-to-vehicle communication or infrastructure-to-vehicle communication. The building corners and the possibly noted further objects are described in the map as 2D-point information. The actual positon of the transportation vehicle can be determined very precisely by an equalization calculus in which positions of the detected building corners are moved from a preliminary position of the transportation vehicle into correspondence with the map. The preliminary position can be made available, for example, by a navigation device. The use of a very stable object class for the determination of a position, specifically the building corners, makes the map largely time-invariant. The map is very stable and has to be updated only rarely. The use of virtual corners in addition to the visible corners has the benefit here that the former can be detected from different transportation vehicle positions despite concealment. The ascertaining of virtual building corners therefore leads to a situation in that there are more points in the space on the basis of which the location-determining process can be carried out. This increases the reliability.

According to at least one disclosed embodiment, the detection of objects in the area surrounding the transportation vehicle comprises: detecting surfaces in the area surrounding the transportation vehicle which are perpendicular to a ground plane; projecting the detected surfaces into the ground plane; and ascertaining visible and virtual building corners from the line sections which result from the projection of the surfaces into the ground plane.

2D line sections are produced as a result of the projection of the detected surfaces onto the ground plane. On the basis of the 2D line sections, visible corners and virtual corners are calculated. The visible corners are here the intersection points of in each case two line sections. Further visible corners result from depth jumps which can be ascertained, for example, from data of a lidar sensor. The virtual corners are the intersection points of in each case two line sections which are extended to form straight lines. The corners are therefore described by 2D point objects. The use of 2D point objects has the benefits of low angle-dependence and/or travel direction-dependence and a low storage requirement of the map.

According to at least one disclosed embodiment, filtering of the detected surfaces is carried out by limitation of surfaces above a specific height. As a result of this filtering, the probability is increased that the detected surfaces are stable surfaces which are actually components of buildings.

According to at least one disclosed embodiment, the objects in the area surrounding the transportation vehicle are detected from data of an imaging sensor, of a radar sensor or of a lidar sensor. With all three types of sensor it is possible to acquire spatial information from which the building corners can be determined. Since such sensors are generally already installed on a series-production basis in contemporary transportation vehicles, no additional costs arise for the required sensor system.

According to at least one disclosed embodiment, chronological tracking of the detected objects is performed. Within the scope of the chronological tracking, the detected objects are linked to older observations. The accuracy of the determination of a position of the objects is increased through this linking to older observations.

According to at least one disclosed embodiment, the objects comprise further infrastructure objects in addition to the visible and virtual building corners. As a result of the acquisition of further infrastructure objects, the reliability and accuracy of the determination of a position can be increased further.

According to at least one disclosed embodiment, the map comprises lane information. The lane information can be noted, for example, as center lines of the lanes in the map. By making available lane information in the map, the assignment of the building corners to the lane geometry can be easily ensured.

According to at least one disclosed embodiment, the detected objects and the position of the transportation vehicle are used for updating the objects in the map or for an algorithm for the simultaneous determination of positions and production of a map. The measurements which are carried out for the determination of positions are therefore used to update the map with objects continuously. It is therefore sufficient if updating of the map is carried out at relatively long time intervals by a supplier of the map. This reduces the costs which are incurred for the map.

A disclosed method or a disclosed device is beneficial used in a vehicle, in particular, a transportation vehicle.

For the sake of better understanding of the principles of the present disclosure, exemplary embodiments are explained in more detail below with reference to the figures. Of course, the disclosure is not limited to these embodiments, and the described features can also be combined or modified without departing from the scope of protection of the disclosure as defined in the appended claims.

FIG. 1 shows a schematic view of a method for determining a position of a transportation vehicle. In a first operation, a preliminary position of the transportation vehicle is determined 10. In addition, objects in an area surrounding the transportation vehicle are detected 11. The objects comprise here at least visible and virtual building corners, but can also comprise further infrastructure objects. The objects can be detected, for example, from data of an imaging sensor, of a radar sensor or of a lidar sensor. The detected objects are then transferred 12 into a local coordinate system, and the objects transferred into the local coordinate system are assigned 13 to a map with objects on the basis of the preliminary position of the transportation vehicle. The map can be stored locally in the transportation vehicle or else made available by a backend, by vehicle-to-vehicle communication or by infrastructure-to-vehicle communication. The map may also comprise lane information in addition to object information. Finally, the position of the transportation vehicle is determined 14 on the basis of an equalization calculus, in which the objects in the map which are most suitable for the objects transferred into the local coordinate system are ascertained. In this context, to improve the determination of a position, chronological tracking of the detected objects can be performed. The detected objects and the position of the transportation vehicle can be used for updating the objects in the map or for an algorithm for simultaneously determining the location and producing a map.

Figure 2:
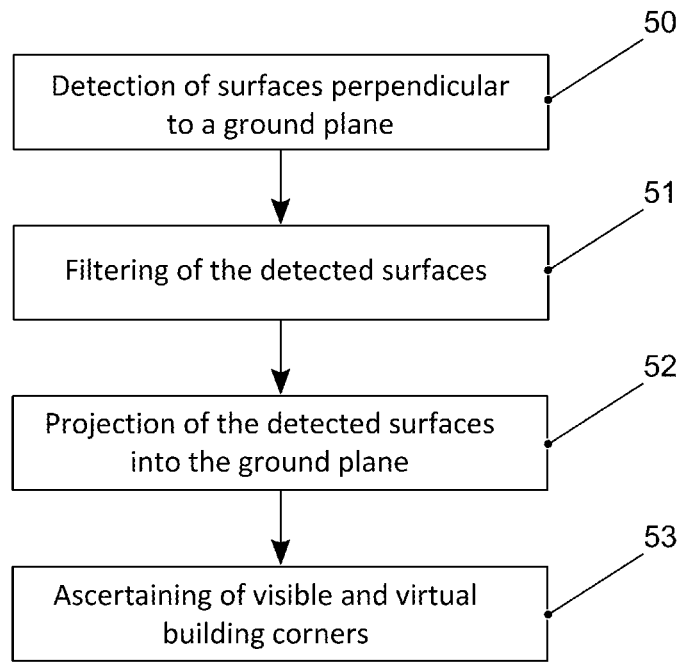
FIG. 2 shows a schematic view of a method for ascertaining visible and virtual building corners.

FIG. 2 shows a schematic view of a method for ascertaining visible and virtual building corners. In a first operation, surfaces perpendicular to a ground plane are detected 50 in the area surrounding the transportation vehicle. Subsequently, filtering 51 of the detected surfaces can optionally be carried out by limitation of surfaces above a specific height. The detected surfaces are then projected 52 into the ground plane. Finally, visible and virtual building corners are ascertained 53 from the line sections which result from the projection of the surfaces into the ground plane. The visible corners can be determined here from the points of intersection of in each case two line sections, while the virtual corners result from the intersection points of in each case two line sections which are extended to form straight lines. Further visible corners result from depth jumps, which can be ascertained, for example, from the data of a lidar sensor.

Figure 3:
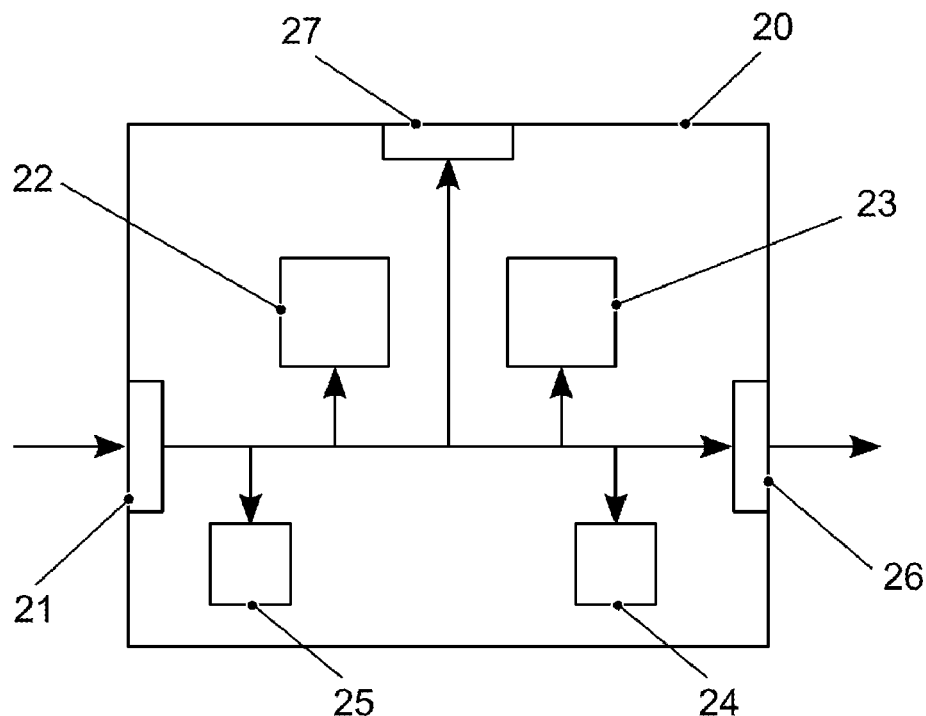
FIG. 3 shows a first embodiment of a device for determining a position of a transportation vehicle.

FIG. 3 shows a simplified schematic illustration of a first disclosed embodiment of a device 20 for determining a position of a transportation vehicle. The device 20 has an input 21, via which, for example, data of an imaging sensor, of a radar sensor or of a lidar sensor as well as information of a navigation device can be received. From the available data, a position-determining unit 22 determines a preliminary position of the transportation vehicle. In addition, a computing unit 23 uses the data to detect objects in an area surrounding the transportation vehicle. The objects comprise here at least visible and virtual building corners, but can also comprise further infrastructure objects. Furthermore, the computing unit 23 transfers the detected objects into a local coordinate system and assigns the objects transferred into the local coordinate system to a map with objects on the basis of the preliminary position of the transportation vehicle. The map can be stored locally in the transportation vehicle or be made available by a backend, by vehicle-to-vehicle communication or by infrastructure-to-vehicle communication. The map may also comprise lane information in addition to object information. Finally, the computing unit 23 determines the position of the transportation vehicle on the basis of an equalization calculus in which objects in the map which are most suitable for the object transferred into the local coordinate system are ascertained. In this context, the computing unit 23 can perform chronological tracking of the detected objects to improve the determination of a position. The position which is ascertained in this way can be provided to further components of the transportation vehicle via an output 26 of the device 20. The detected objects and the position of the transportation vehicle can additionally be used for updating the objects in the map or for an algorithm for the simultaneous determination of a position and production of a map.

The position-determining unit 22 and the computing unit 23 can be controlled by a control unit 24. If appropriate, settings of the position-determining unit 22, of the computing unit 23 or of the control unit 24 can be changed via a user interface 27. The data which occur in the device 20 can where necessary be stored in a memory 25 of the device 20, for example, for later evaluation or for use by the components of the device 20. The position-determining unit 22, the computing unit 23 and the control unit 24 can be implemented as dedicated hardware, for example, as integrated circuits. Of course, they can, however, also be partially or completely combined or implemented as software which runs on a suitable processor, for example, on a GPU or a CPU. The input 21 and the output 26 can be implemented as separate interfaces or as a combined bidirectional interface.

Figure 4:
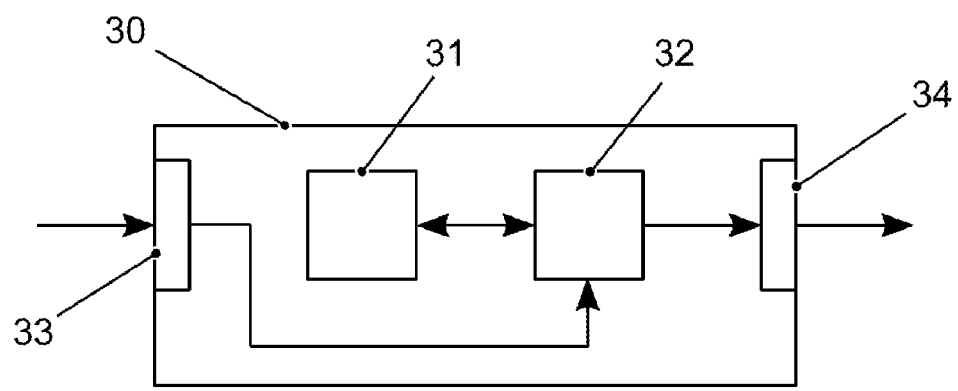
FIG. 4 shows a second embodiment of a device for determining a positon of a transportation vehicle.

FIG. 4 shows a simplified schematic illustration of a second disclosed embodiment of a device 30 for determining a position of a transportation vehicle. The device 30 has a processor 32 and a memory 31. For example, the device 30 is a computer or a control device. In the memory 31, instructions are stored which, when executed by the processor 32, cause the device 30 to execute the operations according to one of the described methods. The instructions stored in the memory 31 therefore embody a program which can be executed by the processor 32 and which is implemented by the disclosed method. The device 30 has an input 33 for receiving information, in particular, data of an imaging sensor, of a radar sensor or of a lidar sensor. Data generated by the processor 32 are made available via an output 34. Furthermore, they can be stored in the memory 31. The input 33 and the output 34 can be combined to form one bidirectional interface.

The processor 32 can comprise one or more processor units, for example, microprocessors, digital signal processors or combinations thereof.

The memories 25, 31 of the described embodiments can have both volatile and non-volatile memory areas and comprise a wide variety of memory devices and memory media, for example, hard disks, optical storage media or semiconductor memories.

Figure 5:
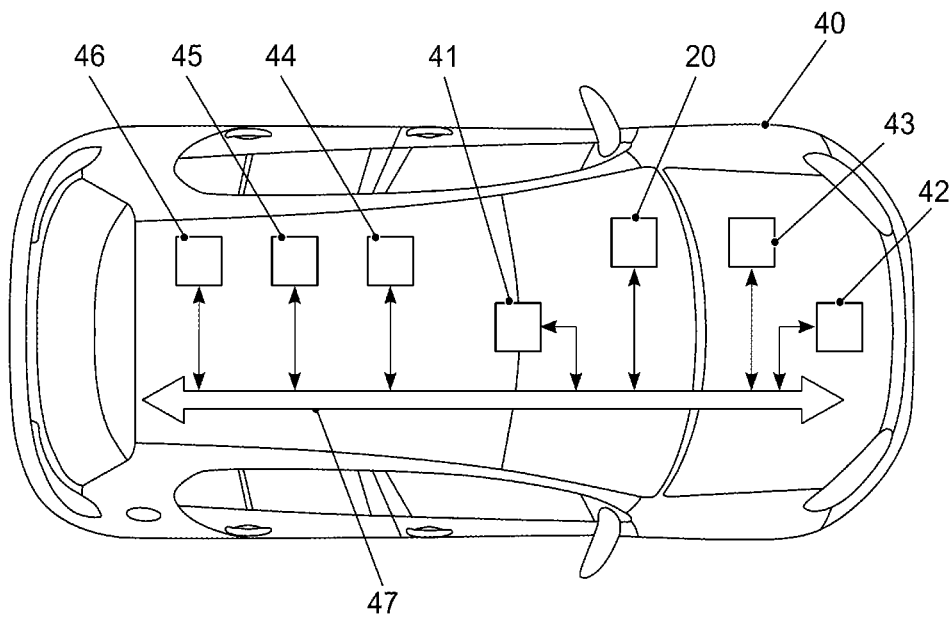
FIG. 5 shows a schematic view of a transportation vehicle in which a disclosed solution is implemented.

FIG. 5 shows a schematic view of a transportation vehicle 40 in which a disclosed solution is implemented. The transportation vehicle 40 has an imaging sensor 41, for example, a camera. In addition, a radar sensor 42 and a lidar sensor 43 are present. Further components of the transportation vehicle 40 are a navigation device 44 by which, for example, a preliminary position of the transportation vehicle 40 can be determined, and a data-transmission unit 45. By the data-transmission unit 45 a connection can be set up to service providers, for example, for receiving the map with object information. A device 20 ascertains a position of the transportation vehicle 40 from the data of the various sensors 41, 42, 43 of the preliminary position of the transportation vehicle 40 and from a map with object information. To store data, a memory 46 is present. The exchange of data between the various components of the transportation vehicle 40 takes place via a network 47.

An exemplary embodiment will be described in more detail below with reference to FIGS. 6 to 12.

Figure 6:
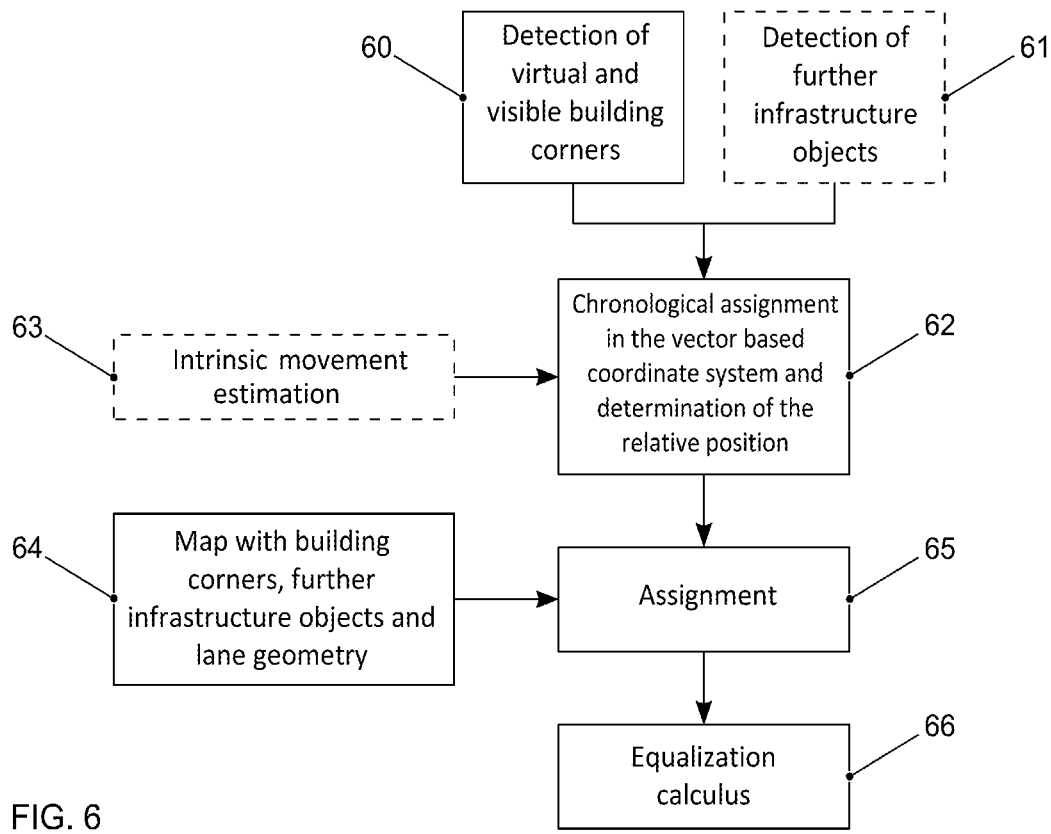
FIG. 6 shows a schematic view of a system diagram of the disclosed solution.

FIG. 6 shows a schematic view of a system diagram of the disclosed solution. In a first operation at 60, detection of virtual and visible building corners is carried out. For this purpose, surfaces are firstly detected on the basis of a data frame, i.e., at a specific point in time, using an imaging sensor system. In this context, filtering of the detected surfaces can be carried out by limitation to surfaces only above a defined height above the ground plane. This measure increases the probability of there being stable surfaces which are actually a component of buildings. The detected surfaces are then projected onto the ground plane so that 2D line sections are produced. Visible corners and virtual corners are calculated on the basis of the 2D line sections. Visible corners are the intersection points of two intersecting line sections. Further visible corners result from depth jumps. Virtual corners are calculated by the extension of section lines and the formation of intersection points of the straight lines which have been produced in this way. The visible corners therefore form a subset of the virtual corners. Virtual corners largely do not correspond to a physical object but instead can be a free point in the ground plane. In addition to the virtual and visible building corners, further infrastructure objects can be optionally detected 61, e.g., posts or poles, road signs etc.

In a further operation at 62, the detected objects are transferred into a vector-based local coordinate system. In this case, chronological assignment is carried out in the vector-based coordinate system, and the relative position with respect to the transportation vehicle is determined. The detected objects can optionally be linked to older observations and therefore tracked over time, to improve their estimated position. Optional intrinsic movement estimation 63 can be used to achieve improved determination of the preliminary position of the transportation vehicle. In addition, an a-priori map with building corners, further infrastructure objects and lane geometries is made available 64, to which a-priori map the detected objects are assigned in an assignment operation at 65. Finally, the visible or virtual 2D objects which are ascertained are assigned to the building corners of the map by an equalization calculus 66, thereby to ascertain the actual position of the transportation vehicle. Since the map also contains lane geometries, the position needs to be understood relative to the lanes.

Figure 7:
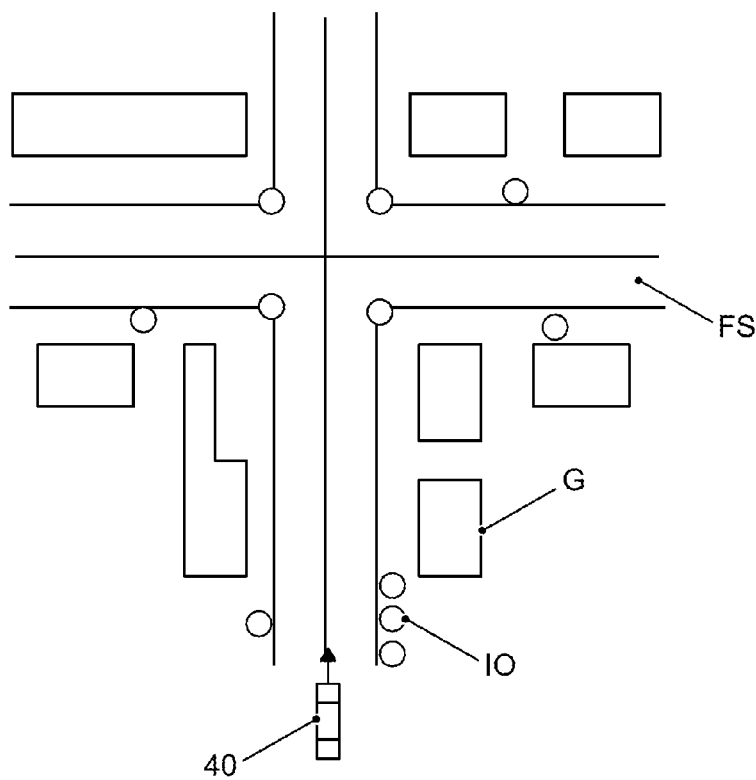
FIG. 7 shows a schematic view of a real situation in the area surrounding a transportation vehicle.

FIG. 7 shows a schematic view of a real situation in the area surrounding a transportation vehicle 40. A row of buildings G, which is represented in FIG. 7 by rectangles or a combination of rectangles, is arranged along the lanes in the region of an intersection. In addition, the diverse infrastructure objects IP, for example, posts or poles, road signs and traffic light systems etc. are located in the area surrounding the transportation vehicle 40. These are illustrated as simple circles in FIG. 7.

Figure 8:
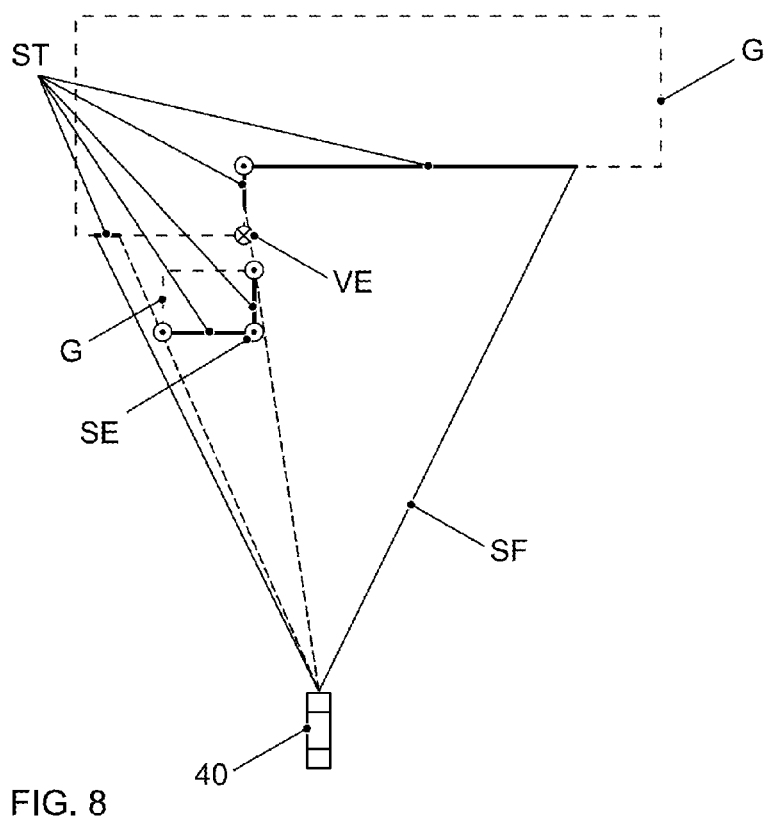
FIG. 8 illustrates the definition of real and virtual building corners.

FIG. 8 illustrates the definition of real building corners SE and virtual building corners VE. In the field of vision SF of the transportation vehicle 40 there are two buildings indicated by dashed lines. The building G which is at the front from the point of view of the transportation vehicle 40 conceals the rear building G partially in this case. The concealed region is indicated in FIG. 8 by the dashed lines starting from the transportation vehicle 40. In specific terms five surfaces, from which the five line sections ST illustrated in the figure are ascertained by a projection into the ground plane, are acquired. Two visible corners SE can be ascertained directly from the intersection points of the section lines ST. Two further visible corners result from the end points of the line sections ST which are ascertained for the front building G and can be detected, for example, on the basis of depth jumps. In addition, a virtual building corner VE can be determined from the line sections ST which are ascertained for the rear building G. For this purpose, the line sections ST are extended to form straight lines, and the intersection point of these straight lines is determined. Ends of line sections, which result from concealments or the boundary of the field of vision SF of the transportation vehicle 40, are not considered to be building corners.

Figure 9:
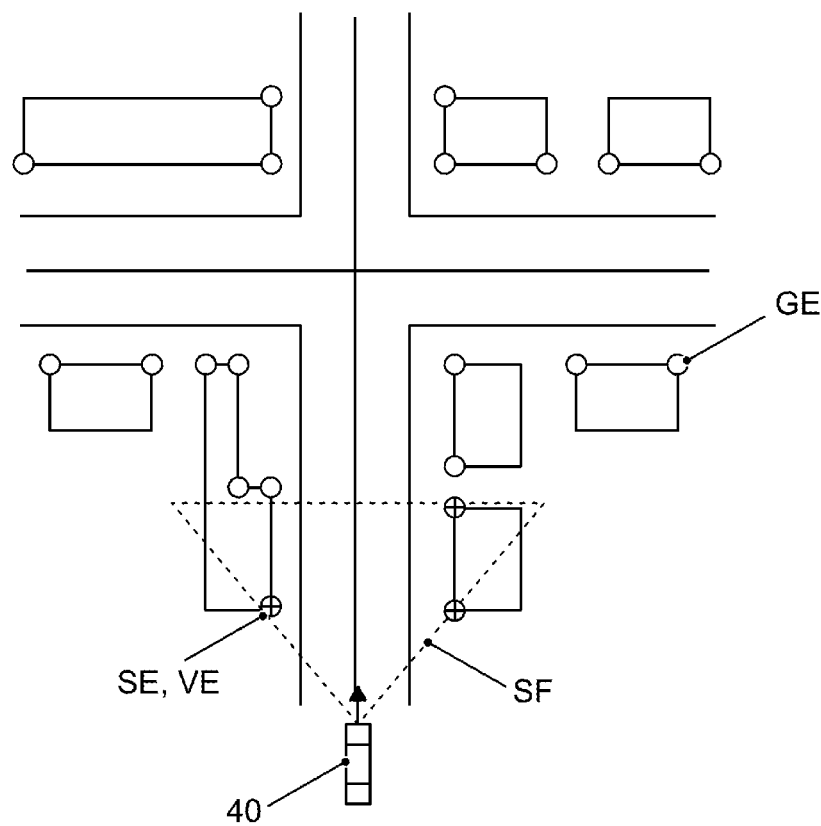
FIG. 9 shows an overview of the detected or visible objects from the point of view of the transportation vehicle for the situation in FIG. 7.

FIG. 9 shows an overview of the relevant building corners GE for the situation from FIG. 7. For the sake of simplicity, only the building corners GE which face the lanes are indicated in the figure. Of all the building corners GE which can be used for the determination of positions, only three are located in the usable field of vision SF of the transportation vehicle 40, i.e., in the region in which evaluation of the available data of the sensor system is reasonably possible. These building corners are detected as visible or virtual building corners SE, VE by the sensor system of the transportation vehicle 40.

Figure 10:
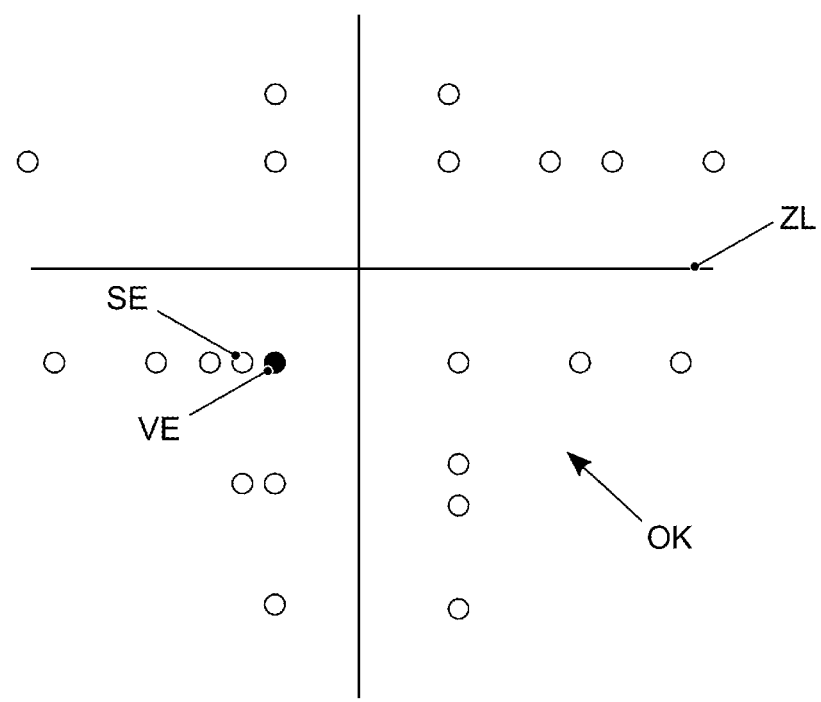
FIG. 10 illustrates a map description of the situation in FIG. 7.

FIG. 10 illustrates a map description of the situation from FIG. 7. The lanes are represented in the map OK by their center line ZL. The buildings which are present are represented in the map as the positions of the associated real building corners SE and of the virtual building corners VE which result from the walls of the buildings. In the example, for the sake of simplicity only one virtual building corner VE is illustrated for the L-shaped building. For the sake of simplicity, only the building corners facing the lanes are also shown here. Of course, the further building corners can also be indicated entirely or partially in the map OK.

Figure 11:
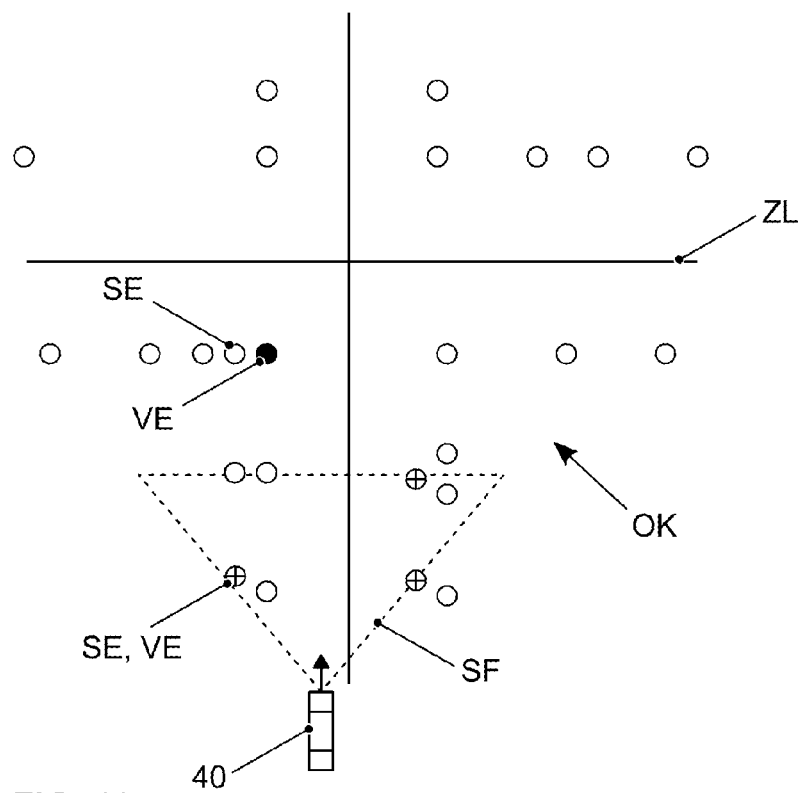
FIG. 11 illustrates the superimposition of the map and the detected objects based on the preliminary position.

FIG. 11 illustrates the superimposition of the map OK and of the detected building corners SE, VE on the basis of the preliminary position, i.e., before an equalization calculus is carried out. The acquisition of the visible and virtual building corners SE, VE is subject to errors, in the figure the positions of the detected building corners are shifted with respect to the actual positions. Therefore, there is no direct correspondence between the detected building corners SE, VE and the building corners in the map OK.

Figure 12:
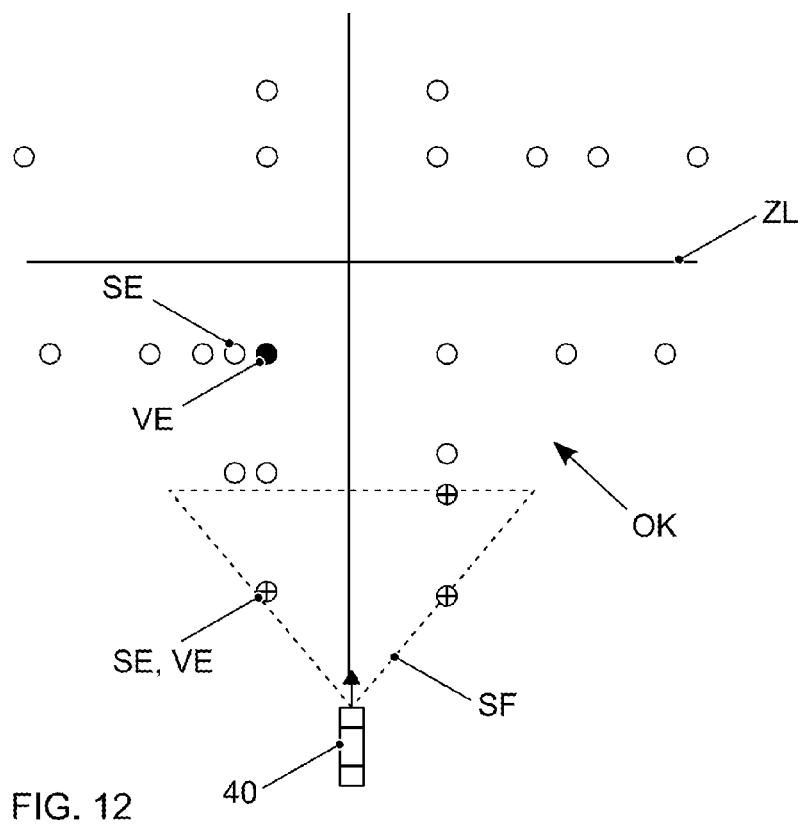
FIG. 12 illustrates the superimposition of the map and the detected objects after an equalization calculus.

FIG. 12 illustrates the superimposition of the map and of the detected objects SE, VE after an equalization calculus. The equalization calculus can be based, for example, on a minimization of the sum of the distances or of the sum of the squares of the distances between the detected objects SE, VE and the building corners in the map OK. In the example in FIG. 12, the detected objects SE, VE can be brought into good correspondence with the map OK. The position of the transportation vehicle 40 with respect to the map OK is obtained directly from the relative positions of the detected objects SE, VE with respect to the transportation vehicle 40.

LIST OR REFERENCE NUMBERS

10 Determination of a preliminary position of the transportation vehicle
11 Detection of objects in an area surrounding the transportation vehicle
12 Transfer of the detected objects into a local coordinate system
13 Assignment of the transferred objects to a map with objects
14 Determination of the position based on an equalization calculus
20 Device
21 Input
22 Position-determining unit
23 Computing unit
24 Control unit
25 Memory
26 Output
27 User interface
30 Device
31 Memory
32 Processor
33 Input
34 Output
40 Transportation vehicle
41 Imaging sensor
42 Radar sensor
43 Lidar sensor
44 Navigation device
45 Data-transmission unit
46 Memory
47 Network
50 Detection of surfaces perpendicular to a ground plane
51 Filtering of the detected surfaces
52 Projection of the detected surfaces into the ground plane
53 Acquisition of visible and virtual building corners
60 Detection of virtual and visible building corners
61 Detection of further infrastructure objects
62 Chronological assignment in the vector-based coordinate system and determination of the relative position
63 Intrinsic movement estimation
64 Making available of a map with building corners, further infrastructure objects and lane geometries
65 Assignment
66 Equalisation calculus
GE Building corner
FS Lane
G Building
IO Infrastructure objects
OK Map with objects
SE Visible building corner
SF Field of vision
ST Line section
VE Virtual building corner
ZL Centre line

The invention claimed is:

1. A device for determining a position of a transportation vehicle, the device comprising:
a position-determining unit for determining a preliminary position of the transportation vehicle; and
an imaging sensor for detecting objects in an area surrounding the transportation vehicle, wherein the objects comprise at least visible and virtual building corners;
a computing unit configured to:
transfer the detected objects into a vector based local coordinate system;
assign the objects transferred into the vector based local coordinate system to objects in an a-priori map based on the preliminary position of the transportation vehicle,
determine the position of the transportation vehicle based on an equalization calculus, and
generate a superimposition of the object map based on the determined position of the transportation vehicle.

2. The device of claim 1, wherein the detection of objects in the area surrounding the transportation vehicle comprises:
detecting surfaces in the area surrounding the transportation vehicle which are perpendicular to a ground plane;
projecting the detected surfaces into the ground plane; and
ascertaining visible and virtual building corners from the line sections which result from the projection of the surfaces into the ground plane.

3. The device of claim 2, wherein the visible corners are the intersection points of line sections, or result from depth jumps, and the virtual corners are the intersection points of line sections which extend to form straight lines.

4. The device of claim 2, wherein filtering of the detected surfaces is carried out by limitation of surfaces above a specific height.

5. The device of claim 1, wherein the computing unit performs a chronological tracking of the detected objects in relation to the a-priori map across time.

6. The device of claim 1, wherein the objects comprise further infrastructure objects in addition to the visible and virtual building corners.

7. The device of claim 1, wherein the a-priori map comprises lane information.

8. The device of claim 1, wherein the a-priori map is stored locally in the transportation vehicle or is made available by a backend, by vehicle-to-vehicle communication or by infrastructure-to-vehicle communication.

9. The device of claim 1, wherein the detected objects and the position of the transportation vehicle are used for updating the objects in the a-priori map or for an algorithm for the simultaneous determination of positions and production of a-priori maps.

10. A method for determining a position of a transportation vehicle, the method comprising:
determining a preliminary position of the transportation vehicle;
detecting objects in an area surrounding the transportation vehicle using an imaging sensor, wherein the objects comprise visible and virtual building corners;
transferring the detected objects into a vector based local coordinate system;

assigning the objects transferred into the local coordinate system to an a-priori map based on the preliminary position of the transportation vehicle; and determining the position of the transportation vehicle based on an equalization calculus, in which the objects in the vector based local coordinate system are assigned to the objects in the a-priori map.

11. The method of claim 10, wherein the detection of objects in the area surrounding the transportation vehicle comprises:

detecting surfaces in the area surrounding the transportation vehicle which are perpendicular to a ground plane;

projecting the detected surfaces into the ground plane; and ascertaining visible and virtual building corners from the line sections which result from the projection of the surfaces into the ground plane.

12. The method of claim 11, wherein the visible corners are the intersection points of line sections or result from depth jumps, and the virtual corners are the intersection points of line sections which extend to form straight lines.

13. The method of claim 11, wherein filtering of the detected surfaces is carried out by limitation of surfaces above a specific height.

14. The method of claim 10, further comprising the chronological tracking of the detected objects in relation to the a-priori map across time.

15. The method of claim 10, wherein the objects comprise further infrastructure objects in addition to the visible and virtual building corners.

16. The method of claim 10, wherein the a-priori map comprises lane information.

17. The method of claim 10, wherein the a-priori map is stored locally in the transportation vehicle or is made available by a backend, by vehicle-to-vehicle communication or by infrastructure-to-vehicle communication.

18. The method of claim 10, wherein the detected objects and the position of the transportation vehicle are used for updating the objects in the a-priori map or for an algorithm for the simultaneous determination of positions and production of a-priori maps.

* * * * *